US009825662B2

(12) United States Patent
Mian et al.

(10) Patent No.: US 9,825,662 B2
(45) Date of Patent: Nov. 21, 2017

(54) WIRELESS TRANSMISSION THROUGH FARADAY CAGE ENCLOSURE (71) Applicant: International Electronic Machines Corporation, Troy, NY (US)

(72) Inventors: Zahid F. Mian, Loudonville, NY (US); Bruce McKenney, Selkirk, NY (US); Ryk E. Spoor, Troy, NY (US)

(73) Assignee: INTERNATIONAL ELECTRONICS MACHINES CORPORATION, Troy, NY (US)

( * ) Notice: Subject to any disclaimer, the term of this patent is extended or adjusted under 35 U.S.C. 154(b) by 0 days.

(21) Appl. No.: 14/695,628

(22) Filed: Apr. 24, 2015

(65) Prior Publication Data
US 2016/0020812 A1 Jan. 21, 2016

Related U.S. Application Data (60) Provisional application No. 61/995,941, filed on Apr. 25, 2014.

(51) Int. Cl.
*H04B 17/00* (2015.01)
*H04B 1/00* (2006.01)
*H04B 1/3827* (2015.01)
*H01Q 1/24* (2006.01)
*H01Q 1/42* (2006.01)
*H01Q 1/44* (2006.01)
*H01Q 1/52* (2006.01)

(52) U.S. Cl.
CPC ........... *H04B 1/3827* (2013.01); *H01Q 1/243* (2013.01); *H01Q 1/42* (2013.01); *H01Q 1/44* (2013.01); *H01Q 1/526* (2013.01)

(58) Field of Classification Search
CPC .............................. G01R 29/105; H04B 17/00
USPC .... 455/67.11–67.12, 115.1, 226.1, 300–301, 455/66.1
See application file for complete search history.

(56) References Cited

U.S. PATENT DOCUMENTS

| 6,798,385 | B2 | 9/2004 | Kirino | |
| 7,412,899 | B2 | 8/2008 | Mian et al. | |
| 8,295,777 | B1* | 10/2012 | Yenney | H04W 24/06 455/435.1 |
| 8,700,924 | B2 | 4/2014 | Mian et al. | |
| 2005/0278756 | A1* | 12/2005 | Brown | G06F 13/376 725/80 |
| 2011/0080327 | A1 | 4/2011 | Kobayashi et al. | |

(Continued)

FOREIGN PATENT DOCUMENTS

WO 2014123938 A1 8/2014

*Primary Examiner* — Simon Nguyen
(74) *Attorney, Agent, or Firm* — Labatt, LLC (57) ABSTRACT A solution for communicating between devices located within and outside of an effective Faraday cage volume is provided. An enclosure structure forming the effective Faraday cage volume can be used as an antenna for a transceiver of a wireless device located within the Faraday cage volume. An antenna connector of a transceiver of the wireless device can be physically connected to the conductive material of the enclosure structure using any solution. The enclosure structure can transmit wireless signals generated by the wireless device external of the enclosure structure and/or transmit external wireless signals to the transceiver of the wireless device for processing by the device.

21 Claims, 5 Drawing Sheets

(56) References Cited

U.S. PATENT DOCUMENTS

| | | | |
|---|---|---|---|
| 2012/0094668 A1* | 4/2012 | Vratskides | H04W 48/16 455/435.1 |
| 2013/0221680 A1 | 8/2013 | Mian et al. | |
| 2013/0342356 A1* | 12/2013 | Wang | G08C 19/00 340/870.01 |
| 2014/0094214 A1* | 4/2014 | Meyer | H04W 52/242 455/522 |
| 2014/0119162 A1* | 5/2014 | Yeary | G10K 11/24 367/178 |
| 2015/0109941 A1* | 4/2015 | Zhang | H04B 17/0085 370/252 |
| 2015/0215684 A1* | 7/2015 | Kauffman | G06K 19/0723 340/870.16 |
| 2015/0372378 A1* | 12/2015 | Anderson | H01P 3/06 343/905 |

* cited by examiner

WIRELESS TRANSMISSION THROUGH FARADAY CAGE ENCLOSURE

REFERENCE TO RELATED APPLICATIONS

The current application claims the benefit of U.S. Provisional Application No. 61/995,941, which was filed on 25 Apr. 2014, and which is hereby incorporated by reference.

GOVERNMENT LICENSE RIGHTS

This invention was made with government support under contract no. N68335-12-C-0408 awarded by the US Department of Defense. The government has certain rights in the invention.

TECHNICAL FIELD

The disclosure relates generally to wireless communications, and more particularly, to a solution for providing wireless communications through an enclosure forming an effective Faraday case volume.

BACKGROUND ART

An ideal or perfect Faraday cage is an active blocker of electromagnetic waves at or below the highest frequency of interest. In an ideal Faraday cage, an electromagnetic wave having a frequency within the frequency range of interests attempting to pass through the material forming the Faraday cage gives rise to a precisely countervailing electromagnetic signal, in effect canceling it out. An ideal Faraday cage is a sphere around the enclosed volume. Most enclosures which shield, deliberately or otherwise, enclosed volumes from external transmissions, or prevent transmission from the enclosed volume are in fact approximations of a Faraday cage. A volume enclosed by solid metal (e.g., a gas or liquid tank, a rocket motor housing, etc.) or by a mesh that creates an approximation of a Faraday cage (e.g., electrically shielded portions of a device, building, etc.), can be referred to as an effective Faraday cage volume. These enclosures have effects on the effective Faraday cage volume which are very similar, though not identical to, those which would be seen with an ideal Faraday cage.

Current approaches to monitor conditions and/or communicate from within such a volume require a physical breach of the enclosure structure (e.g., the solid metal or mesh), or simply storage of the data until the enclosure is opened from the exterior so that the data can be retrieved. Common approaches for physically breaching the enclosure include drilling a hole through a container, providing a radio-transparent "window" in the container (e.g., a piece of glass), and/or the like. For an enclosed effective Faraday cage volume formed by a mesh Faraday cage, a wire may be run through a space between meshes.

For many applications, prior art approaches have significant drawbacks and/or cannot be used. For example, pressurized tanks or components, such as rocket motor housings, will severely strain any defect—deliberate or otherwise—in the structure during use. Such strain can possibly break the structure, which can have potentially disastrous results. As a result, these structures must have as few flaws as possible. Installing sufficiently resilient radio-transparent windows in such structures, even if possible, is extremely expensive and painstaking work, and will still leave the original components less robust than they would have been otherwise. In some cases, the enclosure itself may also be within another enclosure, which partially or completely blocks radio frequency (RF) transmissions, further complicating the process.

Some prior art wireless communications approaches have proposed to use an electronic enclosure as an antenna. In one approach, a consumer electronics metal housing is used as an antenna to address the lack of space available for a conventional antenna. In other approaches, an antenna is embedded into a casing.

SUMMARY OF THE INVENTION

The inventors recognize a need for a solution for extracting otherwise inaccessible information from within an effective Faraday cage volume. To this extent, an embodiment provides a solution for the wireless transmission of data in real time between a device located within an enclosed effective Faraday cage volume and another device located outside of the enclosed effective Faraday cage volume. Furthermore, an embodiment provides a solution for managing one or more aspects of an interior of the effective Faraday cage volume in real time using a wireless communications solution.

Aspects of the invention provide a solution for communicating between devices located within and outside of an effective Faraday cage volume. An enclosure structure forming the effective Faraday cage volume can be used as an antenna for a transceiver of a wireless device located within the Faraday cage volume. An antenna connector of a transceiver of the wireless device can be physically connected to the conductive material of the enclosure structure using any solution. The enclosure structure can transmit wireless signals generated by the wireless device external of the enclosure structure and/or transmit external wireless signals to the transceiver of the wireless device for processing by the device.

A first aspect of the invention provides a system comprising: an enclosure structure forming an enclosed volume, wherein the enclosed volume is an effective Faraday cage volume; a wireless device located within the enclosed volume; and means for using the enclosure structure as an antenna for a transceiver of the wireless device, wherein the means enables signals generated by the wireless device to be transmitted external of the enclosure structure.

A second aspect of the invention provides an ejection seat comprising: a propellant actuated device including a first enclosure structure forming a first enclosed volume, wherein the first enclosed volume is an effective Faraday cage volume; a first wireless device located within the first enclosed volume; means for using the first enclosure structure as an antenna for a transceiver of the first wireless device, wherein the means enables signals generated by the first wireless device to be transmitted external of the first enclosure structure; a second enclosure structure forming a second effective Faraday cage volume, wherein the first enclosure structure is located within the second enclosure structure; and a second wireless device located external of the first enclosure structure, wherein the second wireless device is in communication with the first wireless device while both the enclosure structures remain fully enclosed.

A third aspect of the invention provides a method of managing an effective Faraday cage volume comprising: receiving data regarding a condition within the effective Faraday cage volume at a wireless device located within the effective Faraday cage volume; transmitting data regarding the condition for processing by a first computer system located external of the effective Faraday cage volume, wherein the transmitting uses an enclosure structure forming the effective Faraday cage volume as an antenna for the wireless device; and receiving the transmitted data at the first computer system using a wireless communications solution.

Other aspects of the invention provide methods, systems, program products, and methods of using and generating each, which include and/or implement some or all of the actions described herein. The illustrative aspects of the invention are designed to solve one or more of the problems herein described and/or one or more other problems not discussed.

BRIEF DESCRIPTION OF THE DRAWINGS

These and other features of the disclosure will be more readily understood from the following detailed description of the various aspects of the invention taken in conjunction with the accompanying drawings that depict various aspects of the invention.

It is noted that the drawings may not be to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

As indicated above, aspects of the invention provide a solution for communicating between devices located within and outside of an effective Faraday cage volume. An enclosure structure forming the effective Faraday cage volume can be used as an antenna for a transceiver of a wireless device located within the Faraday cage volume. An antenna connector of a transceiver of the wireless device can be physically connected to the conductive material of the enclosure structure using any solution. The enclosure structure can transmit wireless signals generated by the wireless device external of the enclosure structure and/or transmit external wireless signals to the transceiver of the wireless device for processing by the device.

As used herein, an "effective Faraday cage volume" is an enclosed volume in which substantially all static and non-static electric fields and substantially all radio frequency electromagnetic radiation within a frequency range of interest (e.g., at or below a given frequency of interest) do not pass through the material forming the enclosed volume. To this extent, substantially all external signals of interest are blocked from reaching the enclosed volume, while substantially all internal signals are blocked from exiting the enclosed volume. It is understood that the term "substantially all" includes all or a sufficient portion of the signals to render them unusable for their intended purpose (e.g., wireless communications between two devices). In an embodiment, at least 99% of the signals are prevented from passing through the material. Unless otherwise noted, the term "set" means one or more (i.e., at least one) and the phrase "any solution" means any now known or later developed solution.

Figure 1A:
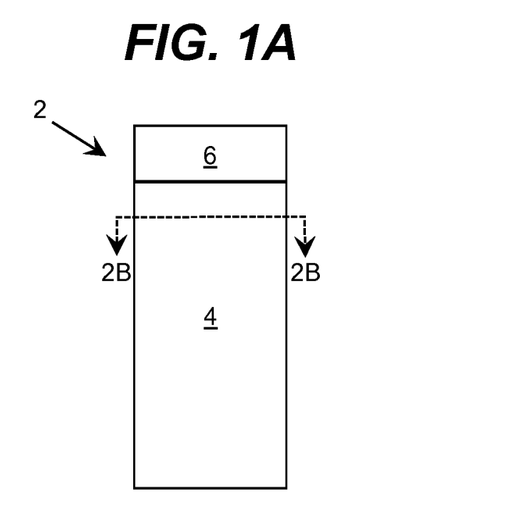
FIGS. 1A and 1B show side and top views, respectively, of an illustrative enclosure structure forming an effective Faraday cage according to an embodiment.
Figure 1B:
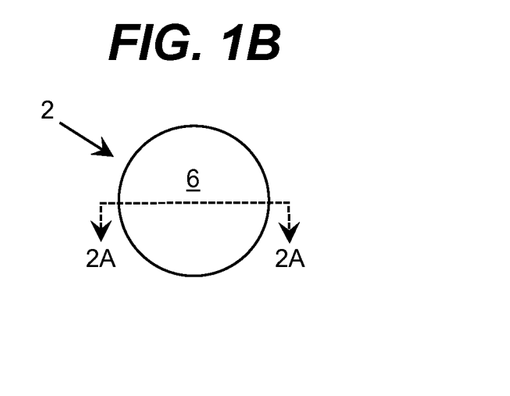

Turning to the drawings, FIGS. 1A and 1B show side and top views, respectively, of an illustrative enclosure structure 2 forming an effective Faraday cage according to an embodiment. In this case, the enclosure structure 2 can include a main body 4 and a cap 6, which form an interior enclosed volume. The cap 6 can be permanently or temporarily secured to the main body 4 using any solution (e.g., threading, adhesive, welding, and/or the like). The main body 4 and cap 6 can be formed of any type of material, which when fully enclosing the interior volume (as shown in FIGS. 1A and 1B), forms an effective Faraday cage volume within the interior volume. Illustrative materials include, for example, conductive materials, such as metal, non-metallic conductors, and/or the like.

While the enclosure structure 2 is shown formed of a solid material, it is understood that a solid material is not necessary to form an effective Faraday cage volume. To this extent, in other embodiments, the enclosure structure 2 can be a non-solid structure, such as a conductive mesh, or the like. Furthermore, the enclosure structure 2 can be formed of a conductive mesh with a supporting matrix material, thereby forming a solid structure. The conductive mesh can be formed of any conductive material (e.g., metal, non-metallic conductors, and/or the like) and have any spacing, which results in substantially all of the electromagnetic radiation of relevant wavelengths being blocked from passing there through. When included, the supporting matrix material can comprise any type of material capable of supporting the conductive mesh including, for example, fiberglass, plastic, resins, and/or the like.

Similarly, while the enclosure structure 2 is shown having a cylindrical shape, it is understood that an enclosure structure 2 can have any size and/or shape suitable for a corresponding application. In an embodiment, the enclosure structure 2 has a shape selected based on its primary functionality provided in the corresponding application. For example, enclosure structures 2 storing explosive gases, pressurized fluids, and/or the like, are often cylindrical to provide a strong structure with a low amount of weak points on the structure 2. In a more particular embodiment, the shape of the enclosure structure 2 is dictated by the application, and is not changeable to improve the antenna characteristics of the enclosure structure 2 as described herein.

Figure 2A:
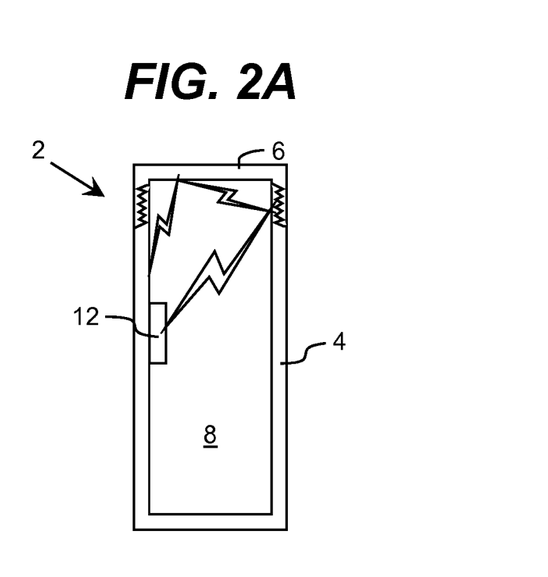
FIGS. 2A and 2B show side and top cutaway views, respectively, of the enclosure structure shown in FIGS. 1A and 1B according to an embodiment.
Figure 2B:
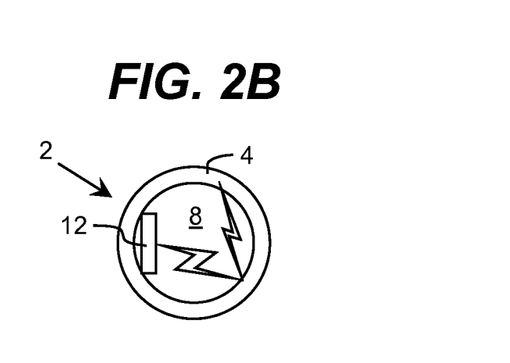
Figure 3:
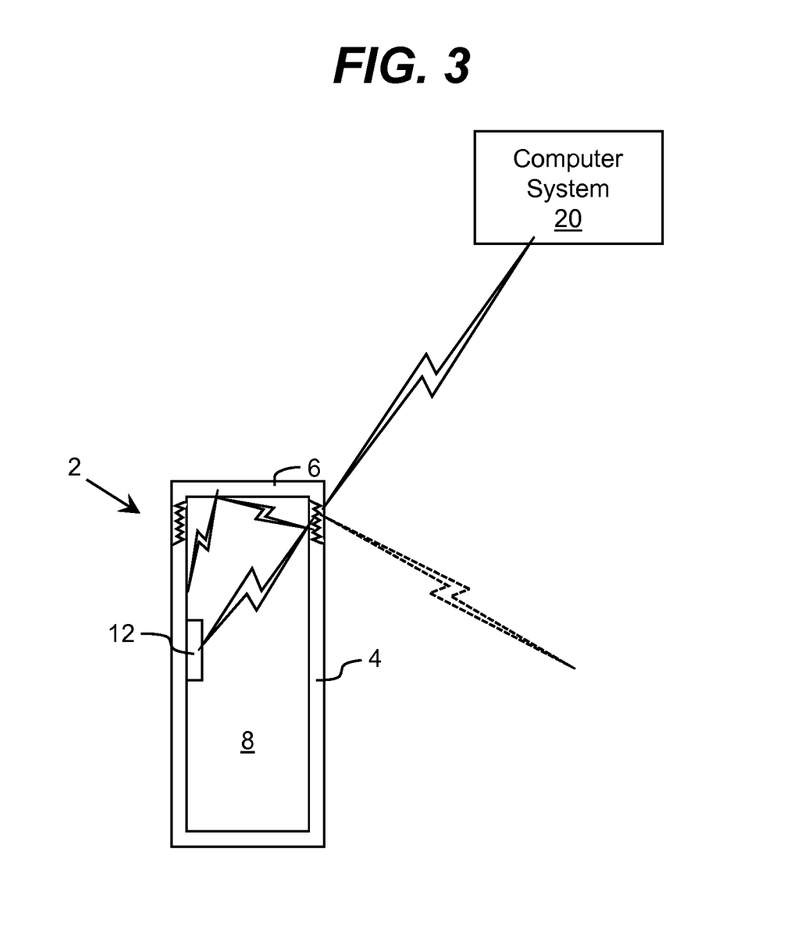
FIG. 3 shows the side cutaway view of the enclosure structure along with an external computer system according to an embodiment.

FIGS. 2A and 2B side and top cutaway views, respectively, of the enclosure structure 2 according to an embodiment. As illustrated, the enclosure structure 2 forms an enclosed effective Faraday cage volume 8, which is usable for any purpose. A device 12 can be located within the enclosed volume 8. The device 12 can be configured for wireless communications. However, as shown, when the device 12 transmits a wireless signal, the signal is absorbed by and/or reflected off of an interior surface of the enclosure structure 2, thereby preventing any usable amount of the wireless signal from escaping the enclosure structure 2. Similarly, FIG. 3 shows the side cutaway view of the enclosure structure 2 along with an external computer system 20 according to an embodiment. As illustrated, wireless signals generated by the computer system 20 are also absorbed by and/or reflected off of an exterior surface of the enclosure structure 2, thereby preventing any usable amount of the external wireless signals from reaching the device 12. To this extent, the device 12 and the computer system 20 are unable to communicate wirelessly with one another due to the enclosure structure 2 forming an effective Faraday cage volume 8, which prevents an effective amount of data signals from entering and exiting the enclosed volume 8.

Figure 4A:
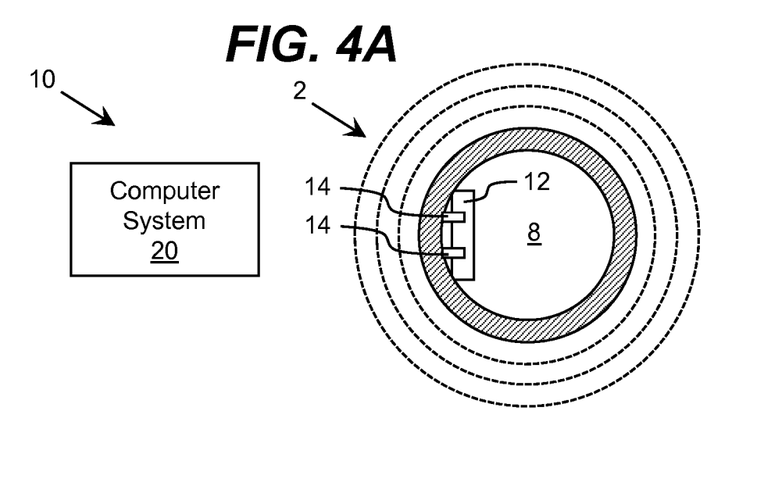
FIGS. 4A and 4B show top and side views, respectively, of an illustrative wireless communications environment according to an embodiment.
Figure 4B:
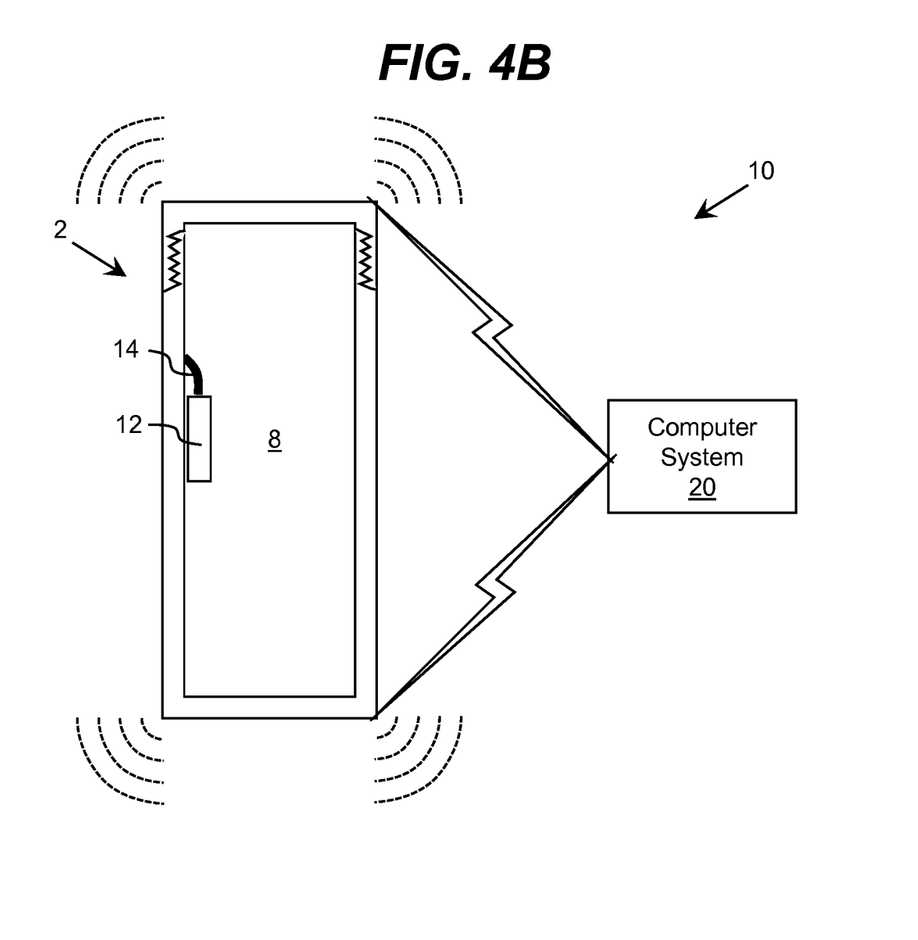

FIGS. 4A and 4B show top and side views, respectively, of an illustrative wireless communications environment 10 according to an embodiment. In this case, the device 12 located in the enclosed volume 8 is physically connected to the enclosure structure 2 by a conductive connector 14. In particular, the conductive connector 14 provides a physical, conductive connection between the conductive material of the enclosure structure 2 and an antenna connector for a transceiver of the device 12. To this extent, the conductive connector 14 can include a wire, built-in antenna contacts of the device 12, and/or the like. While aspects of the invention are shown and described in conjunction with embodiments in which a single wireless device 12 is located within the enclosure structure 2, it is understood that any number of one or more wireless devices 12 can be located within the enclosure structure 2 and configured to use the enclosure structure 2 as an antenna as described herein.

In any event, the conductive connector 14 enables the enclosure structure 2 to serve as an antenna for the device 12. To this extent, the enclosure structure 2 radiates electromagnetic signals sent by the device 12 and absorbs (receives) electromagnetic signals sent by external transmitters, including the computer system 20, and conveys these signals to the device 12 via the conductive connector 14. While primarily shown and described in conjunction with the device 12, it is understood that an embodiment can include the enclosure structure 2 serving as an antenna for the computer system 20, thereby receiving signals sent by the device 12 and transmitting external signals to the device 12. Such an arrangement can be beneficial when, for example, the computer system 20 is located relatively close to and stationary with the enclosure structure 2, multiple wireless devices 12 are located within the enclosure structure 2, and/or the like.

Regardless, rather than being an impediment to wireless communications by electromagnetically isolating the enclosed volume 8, the enclosure structure 2 provides an active part in facilitating wireless communications (e.g., radio communications). In this manner, the computer system 20 can receive and process signals sent by the device 12 and the device 12 can receive and process signals sent by the computer system 20. As a result, the device 12 and the computer system 20 can communicate wirelessly while the device 12 is fully enclosed within the effective Faraday cage volume 8. It is understood that this transmission is facilitated by an enclosure structure 2, which is not an ideal or perfect Faraday cage. For example, the enclosure structure 2 can include some number of edges or other sharp variations in symmetry which allow the enclosure structure 2 to serve as an antenna for the device 12.

Figure 5:
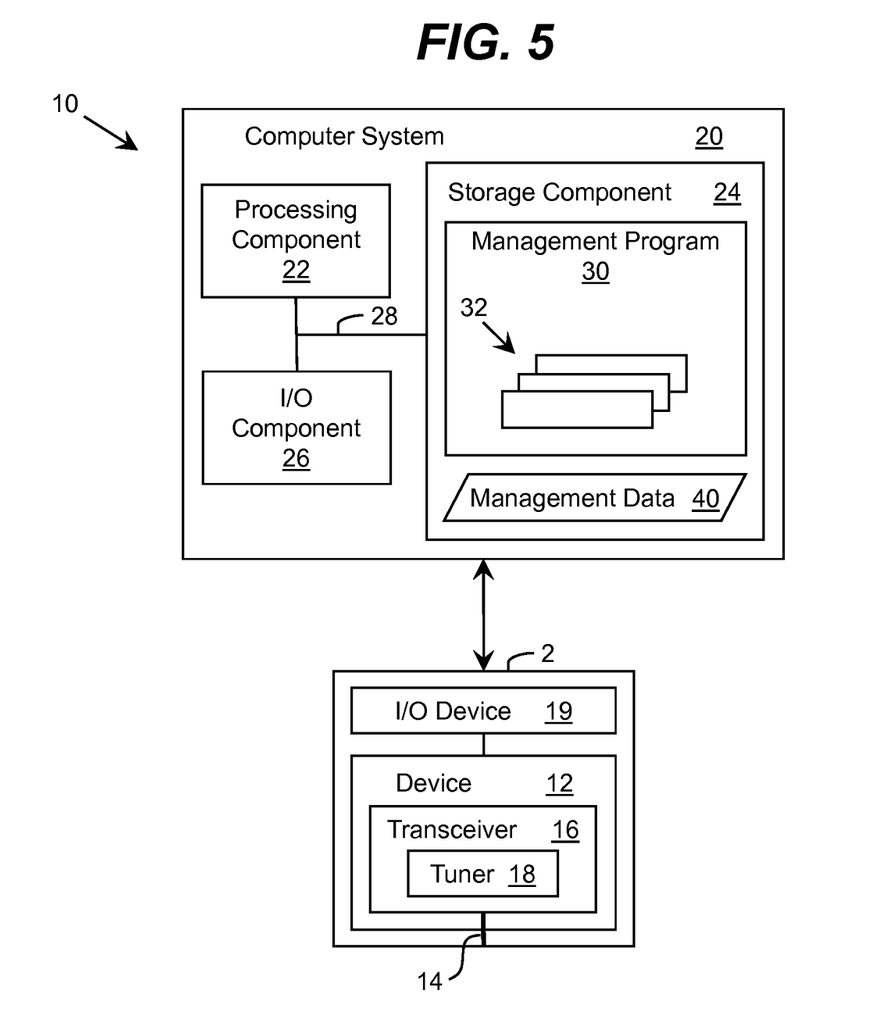
FIG. 5 shows an illustrative block diagram of a wireless communications environment according to an embodiment.

FIG. 5 shows an illustrative block diagram of a wireless communications environment 10 according to an embodiment. As illustrated, the device 12 includes a transceiver 16 (e.g., a radio), which is physically connected to the enclosure structure 2 via a conductive connector 14 and a corresponding antenna connector of the transceiver 16. As a result, the enclosure structure 2 can act as an antenna for the transceiver 16 of the device 12 as described herein.

Additionally, the transceiver 16 can include a tuner 18. The tuner 18 can enable a transmission circuit of the transceiver 16 to be tuned to the antenna characteristics of the enclosure structure 2 using any solution. In particular, the tuner 18 can substantially match an impedance of the transceiver 16 with the impedance of the enclosure structure 2. For example, in an embodiment, the tuner 18 can include circuitry which is configurable by a user based on antenna characteristics (e.g., an impedance) of the enclosure structure 2, e.g., determined prior to deployment of the device 12 inside the enclosure structure 2. Such circuitry can include, for example, one or more of: varactor diodes, ferrodielectric capacitors, variable resistance bridges, and/or the like, with ranges appropriate to the expected range of impedances.

In an embodiment, the device 12 can automatically tune the transceiver 16 to the enclosure structure 2. For example, the device 12 can adjust (e.g., using a setting selectable using computer software executing on the device 12) a value of one or more variable attributes of the tuner 18 over a range of attribute values, and evaluating the corresponding impedances of the enclosure structure 2 and the transceiver 16 for a given frequency to be utilized by the transceiver 16 when communicating wirelessly. The device 12 can determine the value(s) that provide the best match for the impedances and select the value(s) for subsequent use by the transceiver 16. In a further embodiment, the device 12 automatically tunes the transceiver 16 to the enclosure structure 2 in response to determining that the transceiver 16 has been connected to the enclosure structure 2.

In an embodiment, the tuner 18 enables the transmission circuit of the transceiver 16 to be tuned to the antenna characteristics of one of a plurality of selectable antenna characteristics (e.g., impedances). In this case, a user can select the selectable antenna characteristic for the enclosure structure 2 using any solution. Each selectable antenna characteristic can be uniquely identified using any solution. Illustrative identifications can include: material, size, shape, impedance, and/or the like, of the enclosure structure 2. Furthermore, a selectable antenna characteristic can be identified based on a corresponding enclosure structure 2 (e.g., by part/model number) and/or application in which the device 12 is being utilized.

The device 12 can provide any desired functionality while located within the enclosure structure 2. To this extent, the device 12 can send and/or receive data to/from a set of I/O devices 19 located within the enclosure structure 2. Each I/O device 19 can comprise any type of I/O device 19. For example, an I/O device 19 can comprise a sensor for detecting and reporting one or more conditions within the enclosure structure 2 (e.g., temperature, pressure, chemical concentration, microphone, and/or the like). In this case, the device 12 can receive the data from the I/O device 19 and provide the computer system 20 with data corresponding to the condition(s) being monitored using the I/O device(s) 19. Similarly, an I/O device 19 can comprise an output device for altering one or more conditions within the enclosure structure 2 (e.g., temperature, pressure, chemicals, lighting, and/or the like). Such I/O devices 19 can be located anywhere within the enclosure structure 2 and monitor and/or alter any combination of conditions based on the corresponding application.

Furthermore, an I/O device 19 can communicate with the device 12 using a wired or wireless communications solution. In an illustrative embodiment, an I/O device 19 can comprise a radio, which can be utilized by a user present within the enclosure structure 2 to communicate with another user located external from the enclosure structure 2.

In another illustrative embodiment, an I/O device 19 can comprise an audiovisual system, which can enable: monitoring of the enclosed volume 8 (FIGS. 4A and 4B) by an external computer system 20; two-way audio visual communications between individuals located inside and outside of the enclosed volume 8; and/or the like. In this case, the device 12 and computer system 20 can comprise high-bandwidth wireless modems, which can provide a wireless data link capable of being used to transmit voice, video, scientific data, and/or the like.

Figure 6:
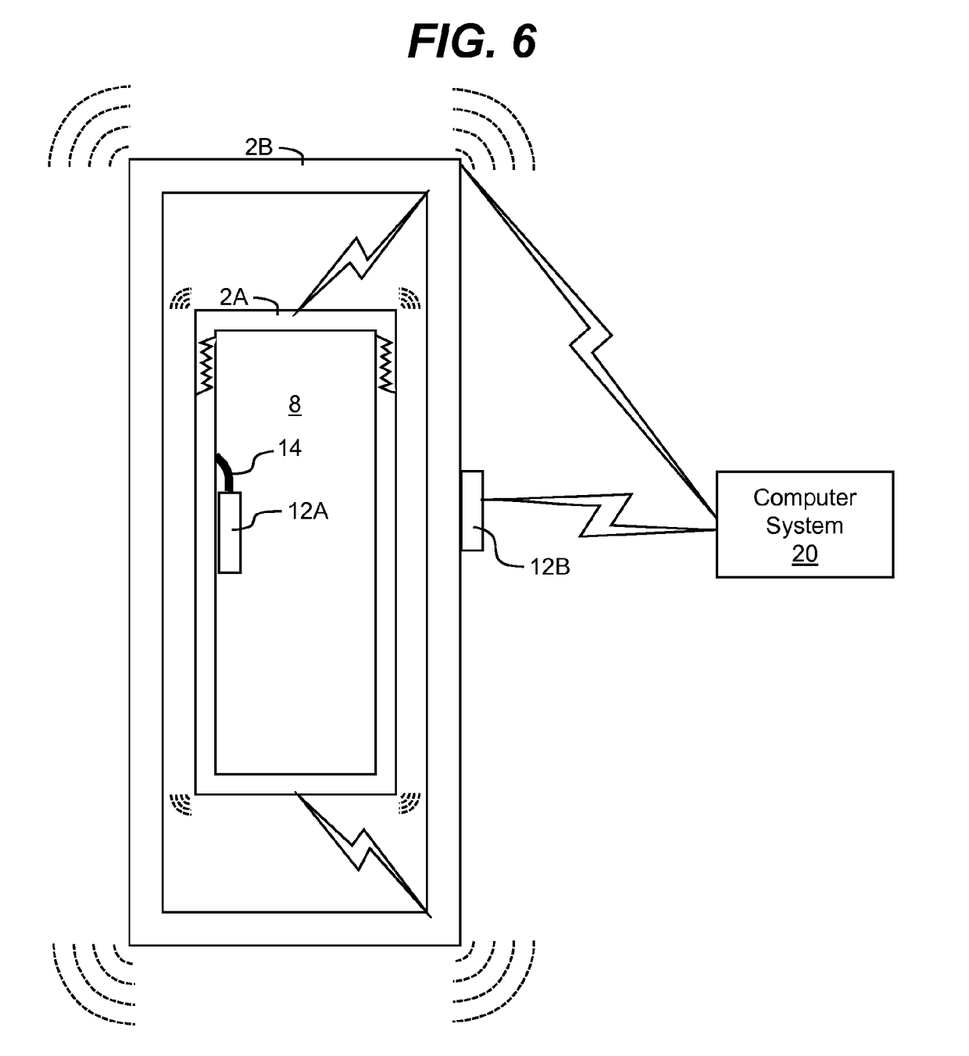
FIG. 6 shows an illustrative side cutaway view of multiple nested enclosure structures along with an external computer system according to an embodiment.

In some environments, multiple nested effective Faraday cage volumes may be present. To this extent, FIG. 6 shows an illustrative side cutaway view of multiple nested enclosure structures 2A, 2B along with an external computer system 20 according to an embodiment. In this case, while the device 12A can transmit external of the enclosure structure 2A by using the enclosure structure 2A as an antenna, such transmitted signals are contained within the enclosure structure 2B, thereby preventing direct communications between the device 12A and the computer system 20.

To this extent, a second device 12B is shown physically connected to the outer enclosure structure 2B. The second device 12B can be physically connected in a manner that allows the outer enclosure structure 2B to act as an antenna for a transceiver of the second device 12B using a solution described herein. In this configuration, the second device 12B can receive signals from and/or transmit signals to the device 12A using a wireless communications solution. The second device 12B can be any type of computing device. To this extent, the second device 12B can be configured similar to the device 12A, the computer system 20, and/or the like. In an embodiment, the second device 12B can be a relay node, which includes components (e.g., a transceiver, a microprocessor, and the like) that enable the second device 12B to relay (receive and retransmit) communications between the device 12A and the computer system 20. While the second device 12B is shown located external of the outer enclosure structure 2B, the second device 12B can be located within the outer enclosure structure 2B (but external of the enclosure structure 2A) and provide data regarding one or more aspects of the environments within one or both enclosure structures 2A, 2B for processing by the computer system 20. In this manner, it is understood that wireless communications can be provided through an arbitrarily large number of nested effective Faraday cage volumes.

Returning to FIG. 5, in an embodiment, communications between the device 12 and the computer system 20 (which can be direct or through a relay) can enable the computer system 20 to manage (e.g., monitor, alter, and/or the like) one or more conditions of the enclosed effective Faraday cage volume 8 in real time using a wireless communications solution. As used herein, it is understood that the term "real time" means that the computer system 20 receives and processes data the enclosed effective Faraday cage volume 8 in sufficient time to initiate and/or perform some desired set of actions based on the data within a given operational deadline for taking the action(s). Illustrative actions include: presenting an alarm prior to a monitored problem present within the volume 8 escalating beyond a certain level; enabling audiovisual communications between parties located inside and outside the volume 8; providing data on one or more conditions within the volume 8 to allow a desired amount of oversight of the volume 8; and/or the like.

To this extent, an embodiment of the wireless communications environment 10 provides a solution for managing an enclosed volume 8 using a computer system 20 located external of the enclosed volume 8. The computer system 20 can perform a process described herein in order to manage one or more aspects of the enclosed volume 8. In particular, the computer system 20 is shown including a management program 30, which makes the computer system 20 operable to manage aspect(s) of the enclosed volume 8 by performing a process described herein.

The computer system 20 is shown including a processing component 22 (e.g., one or more processors), a storage component 24 (e.g., a storage hierarchy), an input/output (I/O) component 26 (e.g., one or more I/O interfaces and/or devices), and a communications pathway 28. In general, the processing component 22 executes program code, such as the management program 30, which is at least partially fixed in storage component 24. While executing program code, the processing component 22 can process data, which can result in reading and/or writing transformed data from/to the storage component 24 and/or the I/O component 26 for further processing. The pathway 28 provides a communications link between each of the components in the computer system 20. The I/O component 26 can comprise one or more human I/O devices, which enable a human user to interact with the computer system 20 and/or one or more communications devices to enable another device, such as the device 12, to communicate with the computer system 20 using any type of communications link. To this extent, the management program 30 can manage a set of interfaces (e.g., graphical user interface(s), application program interface, and/or the like) that enable humans and/or devices 12 to interact with the management program 30. Furthermore, the management program 30 can manage (e.g., store, retrieve, create, manipulate, organize, present, etc.) the data, such as management data 40, using any solution.

In any event, the computer system 20 can comprise one or more general purpose computing articles of manufacture (e.g., computing devices) capable of executing program code, such as the management program 30, installed thereon. As used herein, it is understood that "program code" means any collection of instructions, in any language, code or notation, that cause a computing device having an information processing capability to perform a particular action either directly or after any combination of the following: (a) conversion to another language, code or notation; (b) reproduction in a different material form; and/or (c) decompression. To this extent, the management program 30 can be embodied as any combination of system software and/or application software.

Furthermore, the management program 30 can be implemented using a set of modules 32. In this case, a module 32 can enable the computer system 20 to perform a set of tasks used by the management program 30, and can be separately developed and/or implemented apart from other portions of the management program 30. As used herein, the term "component" means any configuration of hardware, with or without software, which implements the functionality described in conjunction therewith using any solution, while the term "module" means program code that enables a computer system 20 to implement the actions described in conjunction therewith using any solution. When fixed in a storage component 24 of a computer system 20 that includes a processing component 22, a module is a substantial portion of a component that implements the actions. Regardless, it is understood that two or more components, modules, and/or systems may share some/all of their respective hardware and/or software. Furthermore, it is understood that some of the functionality discussed herein may not be implemented or additional functionality may be included as part of the computer system 20.

When the computer system 20 comprises multiple computing devices, each computing device can have only a portion of the management program 30 fixed thereon (e.g., one or more modules 32). However, it is understood that the computer system 20 and the management program 30 are only representative of various possible equivalent computer systems that may perform a process described herein. To this extent, in other embodiments, the functionality provided by the computer system 20 and the management program 30 can be at least partially implemented by one or more computing devices that include any combination of general and/or specific purpose hardware with or without program code. In each embodiment, the hardware and program code, if included, can be created using standard engineering and programming techniques, respectively. While not shown for clarity, it is understood that the device 12 also can comprise a general purpose computing device capable of executing program code installed thereon or a specific purpose computing device in which some or all of the functionality is provided by hardware.

Regardless, when the computer system 20 includes multiple computing devices, the computing devices can communicate over any type of communications link. Furthermore, while performing a process described herein, the computer system 20 can communicate with one or more other computer systems using any type of communications link. In either case, the communications link can comprise any combination of various types of optical fiber, wired, and/or wireless links; comprise any combination of one or more types of networks; and/or utilize any combination of various types of transmission techniques and protocols.

As discussed herein, the computer system 20 communicates with the device 12 using a wireless communications solution, which is facilitated by using the enclosure structure 2 as an antenna for the transceiver 16. Use of the enclosure structure 2 as an antenna for the transceiver 16 can be limited by various factors. For example, good conductive contact must be made between the enclosure structure 2 and the transceiver 16; the device 12 must have sufficient power available to drive the antenna; the enclosure structure 2 must be of sufficient dimensions to reasonably function as an antenna; and/or the like. Regardless, numerous applications are possible even with these limitations.

For example, referring to FIG. 6, the device 12A can comprise a sensor node placed within a rocket motor enclosure 2A, such as may be utilized for a propellant actuated device (PAD). The device 12A can be configured to acquire data regarding any combination of one or more of various conditions within the enclosure structure 2A, such as temperature, propellant stabilizer levels, and/or the like. As stabilizer is consumed at a rate that is increased at higher temperatures, but whose precise rate is very complex and not easily calculated, direct measurement by the device 12A provides a reliable solution for managing operation of the corresponding rocket motor (e.g., assuring safe operation of the rocket motor, determining when the motor requires replacement, and/or the like). To this extent, the device 12A can be configured to transmit data regarding an operating condition of the propellant actuated device to an external computer system 20, using the enclosure structure 2A as an antenna.

However, in a more specific embodiment, the enclosure structure 2A is further placed within a larger enclosure structure 2B. For example, the rocket motor enclosure 2A can be assembled in an ejection seat, which is itself enclosed in another assembly of metal 2B. To this extent, a second device 12B can use the metal assembly 2B for the ejection seat as an antenna and provide a relay for communications between the device 12A and the computer system 20.

Other embodiments of the invention can be utilized in, for example, industrial/commercial tank monitoring applications. To this extent, liquids and gases are often stored in metallic tanks whose only outlets are normally sealed by metallic valves, making the interior volumes effective Faraday cage volumes. In this case, a device 12 can be located within the interior of the tank, e.g., to acquire data regarding the interior of the tank, and can be physically attached to the tank to use the tank as an antenna for wireless communications. The data can be utilized as part of various possible applications for managing the tank, including: monitoring the accumulation of water or other impurities at the bottom of a tank and reporting when a significant amount of such accumulation is present; monitoring a level of a fluid (liquid or gas) within the tank without use of a probe penetrating a side of the tank (e.g., for monitoring hydrogen gas or the like); and/or the like. It is understood that the device 12 can be configured to transmit data regarding the interior of the tank using any schedule, including: in response to detecting an alarm condition; periodically; in response to receiving an interrogation from the computer system 20; and/or the like.

Furthermore, embodiments can be utilized in various applications in which a person is present within the effective Faraday cage volume. For example, such applications can include environments in which one or more people are sealed in a pressure-sealed container. These applications include: research applications, e.g., ranging from deep-sea diving and pressure studies to isolation and environment studies in preparation for deep space travel or the like; medical applications, e.g., a decompression chamber; military applications, e.g., a submarine; and/or the like. Many of the current environments include RF-transparent windows, which represent potential points of failure for the structure and would not be necessary using an embodiment described herein.

While shown and described herein as a method and system for managing an effective Faraday cage volume and/or an assembly including an effective Faraday cage volume, it is understood that aspects of the invention further provide various alternative embodiments. For example, in one embodiment, the invention provides a computer program fixed in at least one computer-readable medium, which when executed, enables a computer system to manage the effective Faraday cage volume and/or the corresponding assembly. To this extent, the computer-readable medium includes program code, such as the management program 30 (FIG. 5), which enables a computer system to implement some or all of a process described herein. It is understood that the term "computer-readable medium" comprises one or more of any type of tangible medium of expression, now known or later developed, from which a copy of the program code can be perceived, reproduced, or otherwise communicated by a computing device. For example, the computer-readable medium can comprise: one or more portable storage articles of manufacture; one or more memory/storage components of a computing device; paper; and/or the like.

In another embodiment, the invention provides a method of providing a copy of program code, such as the management program 30 (FIG. 5), which enables a computer system to implement some or all of a process described herein. In this case, a computer system can process a copy of the program code to generate and transmit, for reception at a second, distinct location, a set of data signals that has one or more of its characteristics set and/or changed in such a manner as to encode a copy of the program code in the set of data signals. Similarly, an embodiment of the invention provides a method of acquiring a copy of the program code, which includes a computer system receiving the set of data signals described herein, and translating the set of data signals into a copy of the computer program fixed in at least one computer-readable medium. In either case, the set of data signals can be transmitted/received using any type of communications link.

In still another embodiment, the invention provides a method of generating a system for managing an effective Faraday cage volume and/or an assembly including an effective Faraday cage volume. In this case, the generating can include configuring a computer system, such as the computer system 20 (FIG. 5), to implement the method of managing an effective Faraday cage volume and/or an assembly including an effective Faraday cage volume described herein. The configuring can include obtaining (e.g., creating, maintaining, purchasing, modifying, using, making available, etc.) one or more hardware components, with or without one or more software modules, and setting up the components and/or modules to implement a process described herein. To this extent, the configuring can include deploying one or more components to the computer system, which can comprise one or more of: (1) installing program code on a computing device; (2) adding one or more computing and/or I/O devices to the computer system; (3) incorporating and/or modifying the computer system to enable it to perform a process described herein; and/or the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A system comprising:
   an enclosure structure forming an enclosed volume, wherein the enclosed volume is an effective Faraday cage volume;
   a wireless device located within the enclosed volume, wherein the wireless device includes a transceiver for generating and receiving electromagnetic signals; and
   an electrically conductive connection between the enclosure structure and the transceiver, wherein the electrically conductive connection enables the enclosure structure to act as an antenna for transmitting the electromagnetic signals generated by the transceiver external of the enclosure structure.

2. The system of claim 1, wherein the enclosure structure is formed of solid metal.

3. The system of claim 1, wherein the enclosure structure is a component of a propellant actuated device.

4. The system of claim 1, wherein the wireless device acquires data regarding conditions within the enclosed volume.

5. The system of claim 1, wherein the wireless device includes a wireless transceiver for use by an individual present in the enclosed volume.

6. The system of claim 1, further comprising a computer system located external from the enclosed volume, wherein the computer system is in wireless communication with the wireless device.

7. The system of claim 1, wherein the enclosure structure comprises a Faraday cage formed of a conductive mesh.

8. The system of claim 1, wherein the wireless device includes means for tuning the transceiver to the enclosure structure.

9. The system of claim 1, further comprising an ejection seat, wherein the enclosure structure is component of a propellant actuated device located with the ejection seat.

10. The system of claim 1, further comprising:
    a second enclosure structure forming a second effective Faraday cage volume, wherein the enclosure structure is located within the second enclosure structure; and
    a second wireless device located external of the enclosure structure, wherein the second wireless device is in communication with the wireless device while both the enclosure structures remain fully enclosed.

11. The system of claim 10, wherein the second wireless device is located external from the second effective Faraday cage volume, the system further comprising means for using the second enclosure structure as an antenna for a transceiver of the second wireless device, wherein the means enables signals generated by the second wireless device to be transmitted internal to the second enclosure structure.

12. The system of claim 11, further comprising a computer system located external of the second enclosure structure, wherein the computer system is in communication with the second wireless device.

13. The system of claim 12, wherein the second wireless device communicates data regarding the effective Faraday cage volume for processing by the computer system.

14. An ejection seat comprising:
    a propellant actuated device including a first enclosure structure forming a first enclosed volume, wherein the first enclosed volume is an effective Faraday cage volume;
    a first wireless device located within the first enclosed volume;
    means for using the first enclosure structure as an antenna for a transceiver of the first wireless device, wherein the means enables electromagnetic signals generated by the first wireless device to be transmitted external of the first enclosure structure;
    a second enclosure structure forming a second effective Faraday cage volume, wherein the first enclosure structure is located within the second enclosure structure; and
    a second wireless device located external of the first enclosure structure, wherein the second wireless device is in communication with the first wireless device while both the enclosure structures remain fully enclosed.

15. The ejection seat of claim 14, wherein the first wireless device acquires data regarding conditions within the first enclosed volume and transmits data regarding an operating condition of the propellant actuated device.

16. The ejection seat of claim 14, wherein the second wireless device is located external from the second effective Faraday cage volume, the ejection seat further comprising means for using the second enclosure structure as an antenna for a transceiver of the second wireless device, wherein the means enables signals generated by the second wireless device to be transmitted internal to the second enclosure structure.

17. The ejection seat of claim 14, further comprising a computer system located external of the second enclosure structure, wherein the computer system is in communication with the second wireless device, and wherein the second wireless device communicates data regarding the first enclosed volume for processing by the computer system.

18. The ejection seat of claim 14, wherein the means for using includes an electrically conductive connection between the enclosure structure and the transceiver, wherein the conductive connection enables the enclosure structure to act as an antenna for transmitting electromagnetic signals generated by the first wireless device external of the first enclosure structure.

19. A method of managing an effective Faraday cage volume comprising:

receiving data regarding a condition within the effective Faraday cage volume at a wireless device located within the effective Faraday cage volume;

transmitting, by the wireless device, data regarding the condition for processing by a first computer system located external of the effective Faraday cage volume, wherein the transmitting uses an enclosure structure forming the effective Faraday cage volume as an antenna for electromagnetic signals generated by the wireless device; and receiving the transmitted data at the first computer system using a wireless communications solution.

20. The method of claim 19, further comprising initiating at least one action in response to processing the data transmitted by the wireless device located within the effective Faraday cage volume.

21. The method of claim 19, further comprising relaying the transmitted data for processing by a second computer system distinct from the first computer system.

* * * * *

UNITED STATES PATENT AND TRADEMARK OFFICE
CERTIFICATE OF CORRECTION

PATENT NO. : 9,825,662 B2  
APPLICATION NO. : 14/695628  
DATED : November 21, 2017  
INVENTOR(S) : Zahid F. Mian, Bruce McKenney and Ryk E. Spoor

Page 1 of 1

It is certified that error appears in the above-identified patent and that said Letters Patent is hereby corrected as shown below:

On the Title Page

"Assignee: INTERNATIONAL ELECTRONICS MACHINES CORPORATION" should read – Assignee: INTERNATIONAL ELECTRONIC MACHINES CORPORATION –.

Signed and Sealed this  
Thirteenth Day of February, 2018

Andrei Iancu  
*Director of the United States Patent and Trademark Office*